(12) United States Patent
Mu

(10) Patent No.: US 12,369,162 B2
(45) Date of Patent: Jul. 22, 2025

(54) DOWNLINK CONTROL INFORMATION TRANSMISSION METHOD AND APPARATUS, COMMUNICATION DEVICE AND STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 407 days.

(21) Appl. No.: 17/776,455

(22) PCT Filed: Nov. 14, 2019

(86) PCT No.: PCT/CN2019/118366
§ 371 (c)(1),
(2) Date: May 12, 2022

(87) PCT Pub. No.: WO2021/092841
PCT Pub. Date: May 20, 2021

(65) Prior Publication Data
US 2022/0408471 A1 Dec. 22, 2022

(51) Int. Cl.
*H04W 72/12* (2023.01)
*H04W 72/23* (2023.01)
*H04W 72/54* (2023.01)

(52) U.S. Cl.
CPC .......... *H04W 72/23* (2023.01); *H04W 72/54* (2023.01)

(58) Field of Classification Search
CPC ......... H04W 72/1289; H04W 72/1226; H04W 72/232; H04W 72/23; H04W 72/54;
(Continued)

(56) References Cited

U.S. PATENT DOCUMENTS 9,369,239 B2* 6/2016 Choi ................. H04L 1/1825
10,687,335 B2* 6/2020 Islam ................ H04W 72/542
(Continued)

FOREIGN PATENT DOCUMENTS

CN 101610564 A 12/2009
CN 107027184 A 8/2017
(Continued)

OTHER PUBLICATIONS

Vivo, "DCI contents and formats", 3GPP TSG RAN WG1 NR Meeting AH 1801, R1-1800198, Vancouver, Canada, Jan. 22-26, 2018.
(Continued)

*Primary Examiner* — Rasheed Gidado
(74) *Attorney, Agent, or Firm* — Volpe Koenig

(57) ABSTRACT

Disclosed in the embodiments of the present disclosure are a DCI transmission method and apparatus, a communication device and a storage medium. The DCI transmission method may include: sending first DCI, the first DCI including: a first information field and a second information field; the first information field contains first indication information and second indication information; the first indication information is used to indicate that uplink transmission succeeds or uplink transmission fails; the second indication information is used when uplink transmission succeeds to indicate that the second information field carries scheduling information for new transmission or transmission parameter adjustment information; and the second indication information is further used when uplink transmission fails to indicate that the second information field carries retransmission scheduling information or access indication information.

16 Claims, 6 Drawing Sheets

(58) Field of Classification Search
CPC ... H04W 72/0446; H04W 72/12; H04W 4/70; H04W 28/065; H04W 74/006; H04W 74/0833; H04L 1/1671; H04L 1/1887
See application file for complete search history.

(56) References Cited

U.S. PATENT DOCUMENTS

| | | | |
|---|---|---|---|
| 12,082,201 B2* | 9/2024 | Yi | H04W 72/23 |
| 2018/0242296 A1 | 8/2018 | Li et al. | |
| 2018/0288794 A1* | 10/2018 | Wang | H04W 4/70 |
| 2019/0208436 A1* | 7/2019 | Zhou | H04B 7/088 |
| 2019/0297605 A1 | 9/2019 | Kim et al. | |
| 2021/0298108 A1* | 9/2021 | Wu | H04W 74/0833 |
| 2022/0070938 A1* | 3/2022 | Wu | H04L 5/0094 |
| 2022/0225395 A1* | 7/2022 | Xu | H04L 1/1864 |

FOREIGN PATENT DOCUMENTS

| | | |
|---|---|---|
| CN | 107872883 A | 4/2018 |
| CN | 110351864 A | 10/2019 |
| WO | 2017/075857 A1 | 5/2017 |
| WO | 2019/161549 A1 | 8/2019 |
| WO | 2019/191987 A1 | 10/2019 |

OTHER PUBLICATIONS

ASUSTeK, "Remaining details on DCI interpretation", 3GPP TSG-RAN WG1 Meeting #93,R1-1807239,Busan, Korea, May, 21-25, 2018.

Chinese Supplementary Search Report issued on Aug. 8, 2023 for Chinese Patent Application No. 2019800029918.

CATT. ""Discussion on NR DCI formats"" 3GPP TSG RAN WGI Meeting NR#3, R1-1715816, Sep. 21, 2017 (Sep. 21, 2017), 20, entire document ;Type-A.

* cited by examiner

DOWNLINK CONTROL INFORMATION TRANSMISSION METHOD AND APPARATUS, COMMUNICATION DEVICE AND STORAGE MEDIUM

CROSS REFERENCE TO RELATED APPLICATIONS

This present application is a U.S. National Stage of International Application No. PCT/CN2019/118366, filed on PCT Nov. 14, 2019, the contents of all of which are incorporated herein by reference in their entireties for all purposes.

BACKGROUND

In recent years, the Internet of Things (IoT) has developed vigorously, bringing a lot of convenience to human life and work. Machine type communication (MTC) and narrowband Internet of Things (NB-IoT) are typical representatives of cellular IoT technology. At present, such technologies have been widely applied in smart cities, such as meter reading; smart agriculture, such as collection of information including temperature and humidity; smart transportation, such as shared bicycles; and many other fields.

SUMMARY

The present disclosure relates to, but is not limited to, the technical field of wireless communication, in particular to a downlink control information (DCI) transmission method and apparatus, a communication device and a storage medium.

Embodiments of the present disclosure provide a DCI transmission method and apparatus, a communication device, and a storage medium.

The first aspect of embodiments of the present disclosure provides a DCI transmission method, including the following steps:
  sending first DCI, the first DCI including: a first information field and a second information field;
  the first information field contains first indication information and second indication information;
  the first indication information is used to indicate that uplink transmission succeeds or uplink transmission fails;
  the second indication information is used when the uplink transmission succeeds to indicate that the second information field carries the scheduling information for new transmission or the transmission parameter adjustment information; and
  the second indication information is further used when the uplink transmission fails to indicate that the second information field carries retransmission scheduling information or access indication information.

The second aspect of embodiments of the present disclosure provides a DCI transmission method, including the following steps:
  receiving first DCI, the first DCI including: a first information field and a second information field;
  the first information field contains first indication information and second indication information; the first indication information is used to indicate that uplink transmission succeeds or uplink transmission fails;
  the second indication information is used when the uplink transmission succeeds to indicate that the second information field carries the scheduling information for new transmission or the transmission parameter adjustment information; and
  the second indication information is further used when the uplink transmission fails to indicate that the second information field carries retransmission scheduling information or access indication information.

The third aspect of embodiments of the present disclosure provides a DCI transmission apparatus, including: a sending module, configured to send first DCI, the first DCI including: a first information field and a second information field;
  the first information field contains first indication information and second indication information;
  the first indication information is used to indicate uplink transmission succeeds or uplink transmission fails;
  the second indication information is used when the uplink transmission succeeds to indicate that the second information field carries the scheduling information for new transmission or the transmission parameter adjustment information; and
  the second indication information is also used when the uplink transmission fails to indicate that the second information field carries retransmission scheduling information or access indication information.

The fourth aspect of embodiments of the present disclosure provides a DCI transmission apparatus, including:
  a receiving module, configured to receive first DCI, the first DCI including: a first information field and a second information field;
  the first information field contains first indication information and second indication information; the first indication information is used to indicate that uplink transmission succeeds or uplink transmission fails;
  the second indication information is used when the uplink transmission succeeds to indicate that the second information field carries the scheduling information for new transmission or the transmission parameter adjustment information; and
  the second indication information is further used when the uplink transmission fails to indicate that the second information field carries retransmission scheduling information or access indication information.

The fifth aspect of embodiments of the present disclosure provides a communication device, including:
  a transceiver;
  a memory; and
  a processor, connected with the transceiver and the memory respectively, and configured to control the transceiver to transmit and receive wireless signals through executing computer-executable instructions stored in the memory, so as to realize the DCI transmission method provided by the first aspect or the second aspect.

The sixth aspect of embodiments of the present disclosure provides a non-transitory computer storage medium, computer-executable instructions are stored in the non-transitory computer storage medium; and the DCI transmission method provided by the first aspect or the second aspect can be realized after the computer-executable instructions are executed by the processor.

DETAILED DESCRIPTION

Figure 1:
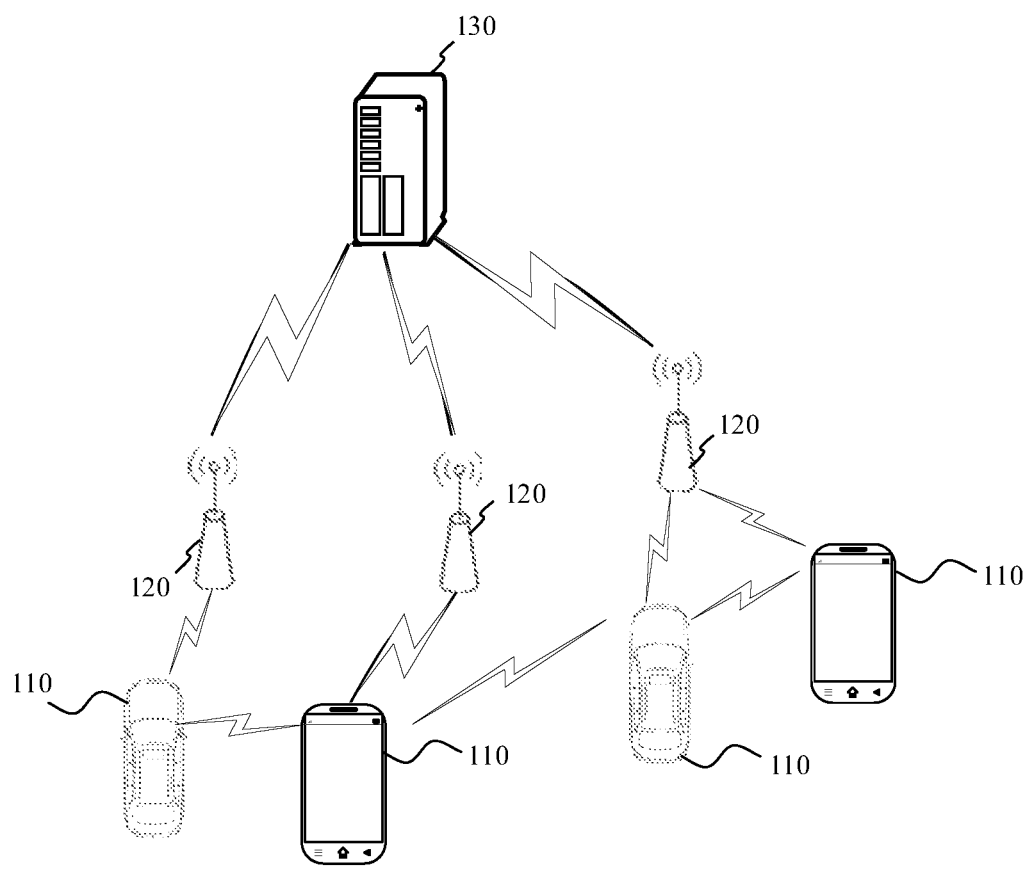
FIG. 1 is a structural diagram of a wireless communication system according to an example.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The network architecture and service scenarios described in the embodiments of the present disclosure are intended to illustrate the technical solutions of the embodiments of the present disclosure more clearly, rather than constituting any limitation to the technical solutions provided by the embodiments of the present disclosure. Those of ordinary skill in the art can know that, along with the evolution of network architecture and the emergence of new business scenarios, the technical solutions provided by the embodiments of the present disclosure are also applicable to similar technical problems.

MTC devices and NB-IoT devices are mostly deployed in basements, and their coverage capabilities are not as good as those of conventional long term evolution (LTE) devices due to their limited hardware capabilities; for example, conventional LTE devices may include mobile phones, etc. Therefore, power is accumulated by using repeated transmissions in MTC devices and NB-IoT devices, so as to achieve the effect of coverage enhancement. In simple terms, repeated transmission refers to transmitting the same transmission content in a plurality of time units. The time unit may be either one subframe or a plurality of subframes.

In addition, as MTC devices are mostly deployed in scenarios where it is not easy to charge or replace a battery, such as in the wild or in basements, power saving is a major feature of applying MTC devices and NB-IoT devices. In this way, when the length of the DCI delivered by a base station is too large, on one hand, the MTC devices and the NB-IoT devices will have high power consumption overhead, and on the other hand, the base station will have high bit overhead.

FIG. 1 shows a structural diagram of a wireless communication system provided by an embodiment of the present disclosure. As shown in FIG. 1, the wireless communication system is a communication system based on cellular mobile communication technology, and the wireless communication system may include: a plurality of terminals 110 and a plurality of base stations 120.

The terminal 110 may be a device that provides voice and/or data connectivity to a user. The terminal 110 may communicate with one or more core networks via a radio access network (RAN), and the terminal 110 may be an IoT terminal, such as a sensor device and a mobile phone (or "cellular" phone), and a computer with an IoT terminal. For example, the terminal 110 may be a stationary, portable, pocket-sized, hand-held, computer-built-in or vehicle-mounted device, such as a station (STA), a subscriber unit, a subscriber station, a mobile station, a mobile, a remote station, an access point, a remote terminal, an access terminal, a user device, a user agent, a user device or user terminal. Or, the terminal 110 may also be a device of an unmanned aerial vehicle. Or, the terminal 110 may also be a vehicle-mounted device, for example, a trip computer with a wireless communication function, or a wireless terminal externally connected to a trip computer. Or, the terminal 110 may also be a roadside device, for example, a streetlight, a signal light, or other roadside device with the wireless communication function.

The base station 120 may be a network-side device in a wireless communication system. The wireless communication system may be the $4^{th}$-generation mobile communication (4G) system, also known as long term evolution (LTE) system; or, the wireless communication system may also be a 5G system, also known as new radio (NR) system or 5G NR system. Or, the wireless communication system may also be a next-generation system of the 5G system. An access network in the 5G system can be called a new generation-radio access network (NG-RAN).

The base station 120 may be an evolution base station (eNB) adopted in the 4G system. Or, the base station 120 may be a base station (gNB) that adopts a centralized distributed architecture in the 5G system. When the centralized distributed architecture is adopted, the base station 120 usually includes a central unit (CU) and at least two distributed units (DU). A protocol stack with a packet data convergence protocol (PDCP) layer, a radio link control (RLC) protocol layer and a media access control (MAC) layer is set in the central unit; and a physical (PHY) layer protocol stack is set in each of the distributed unit, and the embodiment of the present disclosure has no limitation on the specific implementation mode of the base station 120.

Wireless connection may be established between the base stations 120 and the terminals 110 through a wireless air interface. In different implementation modes, the wireless air interface is a wireless air interface based on the $4^{th}$-generation mobile communication network technology (4G) standard; or, the wireless air interface is a wireless air interface based on the $5^{th}$-generation mobile communication network technology (5G) standard, for example, the wireless air interface is a new air interface; or, the wireless air interface may also be a wireless air interface based on a next generation of the 5G mobile communication network technology standard.

In some embodiments, end to end (E2E) connection may also be established between the terminals 110, for example, the scenarios of vehicle to vehicle (V2V) communication, vehicle to infrastructure (V2I) communication and vehicle to pedestrian (V2P) communication in vehicle to everything (V2X) communication.

In some embodiments, the wireless communication system may further include a network management device 130.

The base stations 120 are connected to the network management device 130, respectively. The network management device 130 may be a core network device in the wireless communication system; for example, the network management device 130 may be a mobility management entity (MME) in an evolved packet core (EPC) network. Or, the network management device may also be other core network devices, such as a serving gateway (SGW), a public data network gateway (PGW), a policy and charging rules function (PCRF) unit or a home subscriber server (HSS). The embodiment of the present disclosure has no limitation on an implementation form of the network management device 130.

An embodiment of the present disclosure provides grant-free uplink scheduling.

Figure 2:
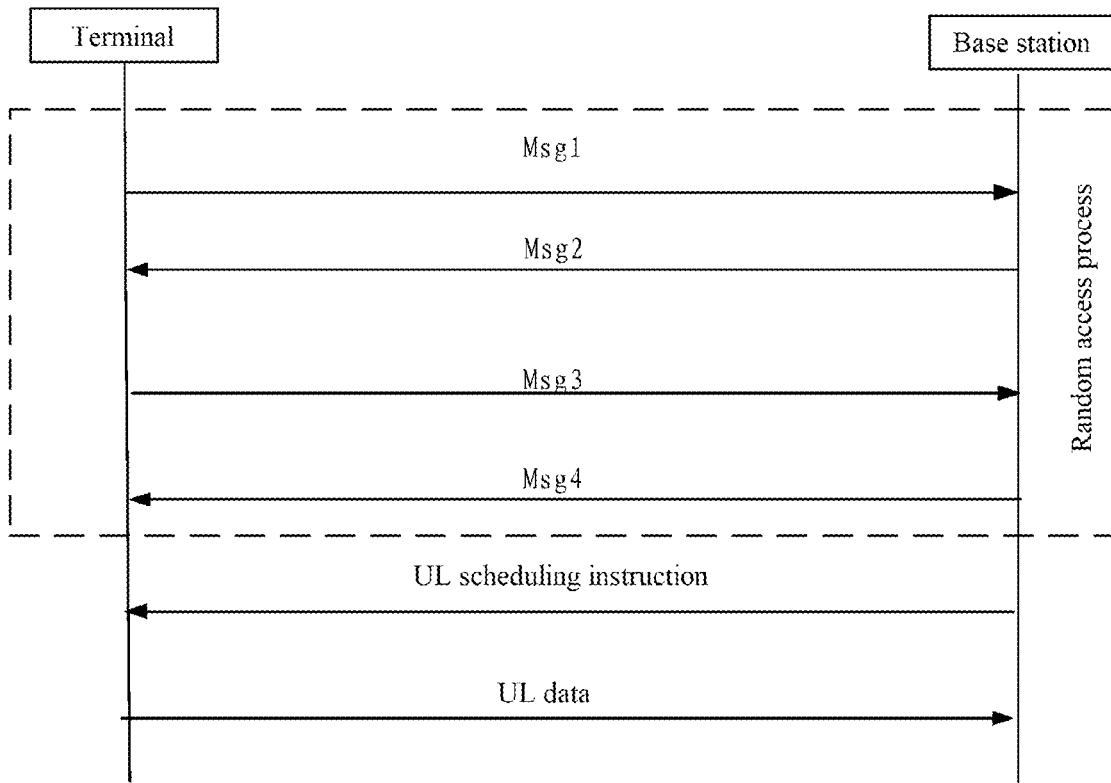
FIG. 2 is a schematic diagram of a random access process and data uploading according to an example.

In an IoT scenario, an amount of data transmitted each time is relatively small. In case of following a conventional LTE data transmission process as shown in FIG. 2, the uplink (UL) data transmission after a random access process will bring huge signaling overheads. The resources occupied by signaling transmission will be far greater than the resources occupied by data transmission. Therefore, for this scenario, grant-free uplink scheduling is introduced in the disclosure scenarios of MTC technology and NB-IoT technology.

As shown in FIG. 2, the random access process may include:

A terminal sends a first message (Msg1); the Msg1 may be a random access request carrying a random access preamble.

In response to the Msg1 from the terminal, a base station delivers a second message (Msg2) to the corresponding terminal. The Msg2 here may be a random access response to the random access request described above.

The terminal then sends a third message (Msg3) to the base station based on the Msg2.

The base station delivers a fourth message (Msg4) based on the Msg3 and the entire random access process ends until the Msg4 transmission is completed.

After the random access is completed, the terminal sends a UL scheduling instruction (UL grant) to the base station; and then the terminal reports UL data.

Figure 3:
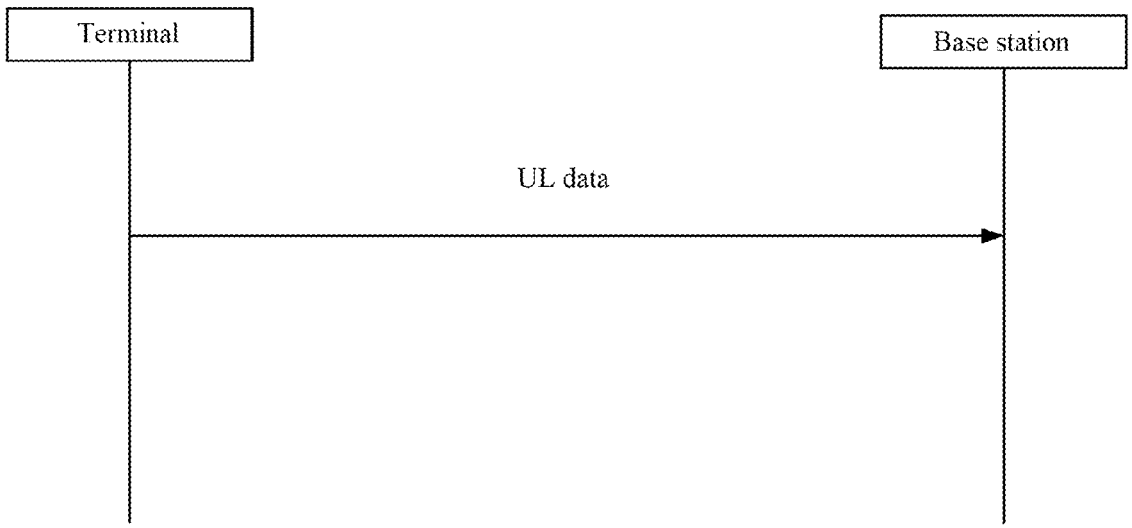
FIG. 3 is a schematic diagram of grant-free scheduled data transmission according to an example.

FIG. 3 shows a schematic diagram of UL data uploading in a grant-free scheduling manner. That is, a base station preconfigures some scheduling information used for user transmission, such as resource allocation information and/or modulation and demodulation mode information. That is, after waking up, a terminal may automatically perform uplink transmission on the preconfigured resources in a preset manner without performing random access and receiving a permission for uplink scheduling, accordingly achieving the objectives of reducing signaling overheads and avoiding power waste.

Considering that the services of most IoT devices are reported periodically, for example, electric meters and water meters report service data at regular intervals, the resources configured in the grant-free uplink scheduling also appear periodically. For example, the base station will configure a time-frequency location for reserved resources, a size of the resources, and a period of appearance, and meanwhile, the base station will also configure the format of user data transmission, such as modulation and coding method. When a user needs to perform coverage enhancement, the base station will also configure the number of repeated transmissions.

Both the first DCI and/or the second DCI provided in some embodiments may be grant-free scheduled DCI. Both the first DCI and/or the second DCI provided in some other embodiments may be grant scheduled DCI.

After the uplink data are sent according to the preconfigured format on the resources preconfigured by the base station, DCI will be detected by monitoring PDCCH search space. The following scenarios included:

Scenario 1: DCI indicates that the previous data transmission is incorrect and retransmission is required for the terminal. DCI contains information such as physical resource where the retransmission is located and retransmission format.

Scenario 2: DCI indicates that the previous data transmission is correct, and the base station has no downlink data or high-level signaling to be sent to the user. In this case, the DCI may contain indications such as adjustment of timing advance (TA) for subsequent transmission and/or adjustment of the number of repeated transmissions.

Scenario 3: DCI indicates that the previous data transmission is correct, and the base station has downlink data or high-level signaling to be further sent to the user. In this case, the DCI contains scheduling information for physical downlink shared channel (PDSCH) resource, including a transmission resource and a transmission format. The PDSCH resource is the communication resource allocated to PDSCH, including a frequency domain resource and a time domain resource.

Scenario 4: DCI indicates that the previous data transmission is incorrect, and the DCI also indicates that the user needs to re-access to the base station using a physical random access channel (RACH) and early data transmission (EDT). The DCI may contain relevant information for random access; for example, the relevant information may include: a random access preamble index, a physical random access channel resource indication (PRACH MASK) and a coverage enhancement level index of the terminal.

For example, 1 bit is firstly used to indicate scenario 1 or scenario 2, scenario 3 and scenario 4 in DCI, and when scenario 2, scenario 3 and scenario 4 are indicated, 2 bits are used to distinguish scenario 2 or scenario 3 or scenario 4. In essence, this indication mode merely indicates 4 scenarios, but an overhead of at least 3 bits is required, and there is a waste of DCI overheads.

Figure 4:
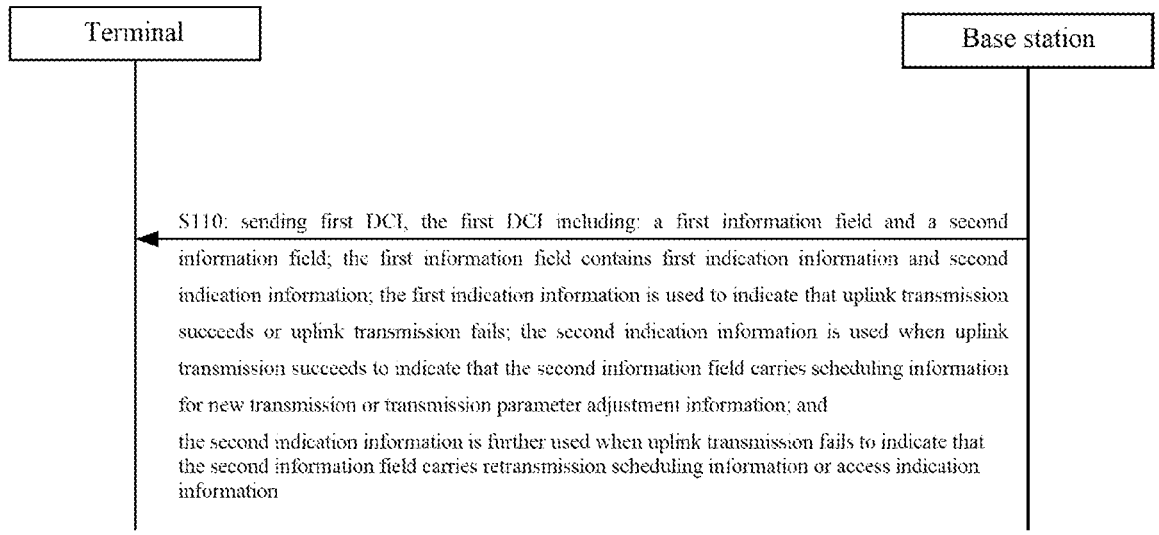
FIG. 4 is a flow chart of a DCI transmission method according to an example.

In view of this, as shown in FIG. 4, the embodiment provides a DCI transmission method, and the method is used in base stations, including the following steps:

S110: sending first DCI, the first DCI including: a first information field and a second information field;

the first information field contains first indication information and second indication information;

the first indication information is used to indicate that uplink transmission succeeds or uplink transmission fails;

the second indication information is used when the uplink transmission succeeds to indicate that the second information field carries scheduling information for new transmission or transmission parameter adjustment information; and the second indication information is further used when the uplink transmission fails to indicate that the second information field carries retransmission scheduling information or access indication information.

A base station may deliver DCI, such as the first DCI, on a physical downlink control channel (PDCCH).

The first DCI here may be either used for grant-free scheduling in a grant-free scheduling scenario, or used for granted scheduling in a granted scheduling scenario. The grant-free scheduling scenario refers to a transmission scenario in which a terminal can directly send or receive data on the resource scheduled by the first DCI without further waiting for the terminal to resend a grant instruction. The granted scheduling scenario refers to a transmission scenario in which a terminal needs to request for resource scheduling and transmits data on the requested resource under the condition that a base station issues a grant instruction. The grant instruction here includes, but is not limited to, an uplink grant instruction (UL grant) and/or a downlink grant instruction (DL assignment).

The first DCI contains a first information field and a second information field.

The first information field contains first indication information and second indication information; the first indication information is used to indicate that the uplink transmission on the terminal succeeds or fails. The second indication information indicates an information content carried in the second information field according to two transmission results that the uplink transmission succeeds or fails.

For example, the first indication information is used to indicate that the previous uplink transmission on the terminal succeeds or fails.

For example, when the uplink transmission succeeds, the second indication information indicates that the second information field carries the scheduling information for new transmission or the transmission parameter adjustment information; and when the uplink transmission fails, the second indication information indicates that the second information field carries retransmission scheduling information or access indication information.

In this way, the information content carried in the second information field of the first DCI may be known after the first information field is decoded, featuring low bit overhead of the first DCI and low overhead for the terminal to decode the first DCI.

In some embodiments, the first information field includes: a first subfield and a second subfield; the first subfield contains at least one first indicator bit carrying the first indication information; and the second subfield contains at least one second indicator bit carrying the second indication information.

In some embodiments, a number of the first indicator bits is equal to a number of the second indicator bits, for example, specifically 1 bit. In this way, the first indicator bit may indicate that the uplink transmission succeeds or the uplink transmission fails through the two states of its bit value as "0" and "1". For example, one first indicator bit with a bit value of "0" indicates that the uplink transmission succeeds, and one first indicator bit with a bit value of "1" indicates that the uplink transmission fails. Or, one first indicator bit with a bit value of "1" indicates that the uplink transmission succeeds, and one first indicator bit with a bit value of "0" indicates that the uplink transmission fails.

The number of second indicator bits contained in the second subfield may be 1. At this time, when the uplink transmission succeeds, the two bit values of one second indicator bit may be used to indicate that the content carried in the second information field is the scheduling information for new transmission or the transmission parameter adjustment information. When the uplink transmission fails, the two bit values of one second indicator bit may be used to indicate that the content carried in the second information field is retransmission scheduling information or access indication information.

In the DCI transmission method provided by the embodiments of the present disclosure, transmitted first DCI contains a first information field and a second information field, a first indicator bit of the first information field is used to carry first indication information indicating that uplink transmission succeeds or uplink transmission fails, so as to indicate second indication information carried in the information content of the second information field in the first DCI. In this way, a bit contained in the second information field is multiplexed to indicate different information contents under the two conditions that the uplink transmission succeeds or the uplink transmission fails; as a result, in comparison with separately setting a special information field in DCI for the conditions that the uplink transmission succeeds and the uplink transmission fails, a number of information fields to be contained in the first DCI is reduced, and the bit overhead of the DCI is reduced.

Meanwhile, when the uplink transmission succeeds, the second information field may be used to indicate the scheduling information for new transmission or the transmission parameter adjustment information; and when the uplink transmission fails, the second information field is used to indicate retransmission scheduling information or access indication information. In this way, under the two conditions that the uplink transmission succeeds or the uplink transmission fails, the second information field may be used to indicate any of the two kinds of information, so that at the time of indicating each information separately, a waste of the second information caused by no need to indicate the information is reduced, and the bit overhead for the first DCI is reduced again.

Due to the small bit overhead for the first DCI, the overhead for a terminal to decode the first DCI is also small, so that the power consumption of the terminal is also reduced.

Figures 6A, 6B, 7:
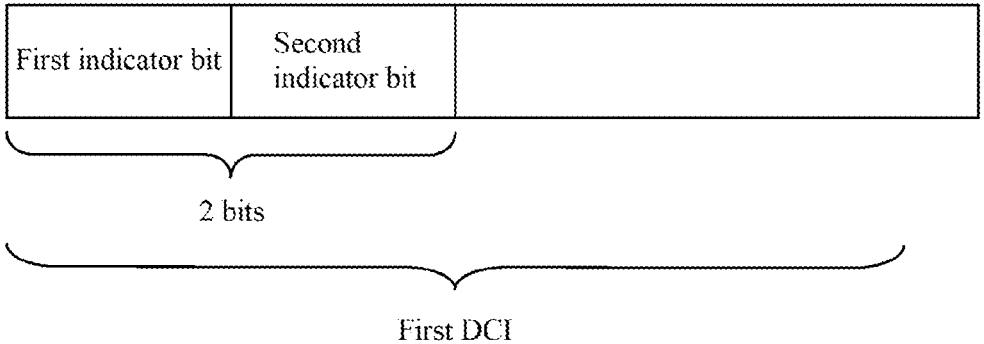
FIG. 6A is a structural diagram of first DCI according to an example.
FIG. 6B is a structural diagram of another first DCI according to an example.
FIG. 7 is a flow chart of a DCI transmission method according to an example.

The first information field in the first DCI as shown in FIG. 6A contains a first indicator bit and a second indicator bit. A total number of bits of the first indicator bit and the second indicator bit is 2 bits, that is, 1 bit for the first indicator bit and 1 bit for the second indicator bit.

In some embodiments, the first indicator bit has different bit values for indicating that the uplink transmission succeeds and the uplink transmission fails.

In some embodiments, when the bit value of the first indicator bit is different from that of a first indicator bit contained in the second DCI, it indicates that the uplink transmission succeeds; and when the bit value of the first indicator bit is the same as that of the first indicator bit contained in the second DCI, it indicates that the uplink transmission fails.

In some other embodiments, when the bit value of the first indicator bit is the same as that of the first indicator bit contained in the second DCI, it indicates that the uplink transmission succeeds; and when the bit value of the first indicator bit is different from that of a first indicator bit contained in the second DCI, it indicates that the uplink transmission fails.

In such two kinds of embodiments, the second DCI is the DCI sent before the first DCI for scheduling the uplink transmission.

Here, whether the current transmission succeeds or fails is indicated by a change in the bit values of second indicator bits in the two DCIs. For example, when a change in the bit value of a second indicator bit in first DCI relative to that of a second indicator bit in second DCI indicates that the transmission succeeds, no change in the bit value of the second indicator bit in the first DCI relative to the second indicator bit in the second DCI indicates that the transmission fails. When no change in the bit value of a second indicator bit in first DCI relative to that of a second indicator bit in second DCI indicates that the transmission succeeds, a change in the bit value of the second indicator bit in the first DCI relative to the second indicator bit in the second DCI indicates that the transmission fails.

In some embodiments, when the uplink transmission succeeds, the second indicator bit has different bit values for indicating that there is PDSCH resource scheduling and there is no PDSCH resource scheduling.

When the uplink transmission fails, the bit value of the second indicator bit for indicating a terminal to retransmit the uplink transmission is different from that for triggering the terminal to perform random access or EDT access.

Figure 5:
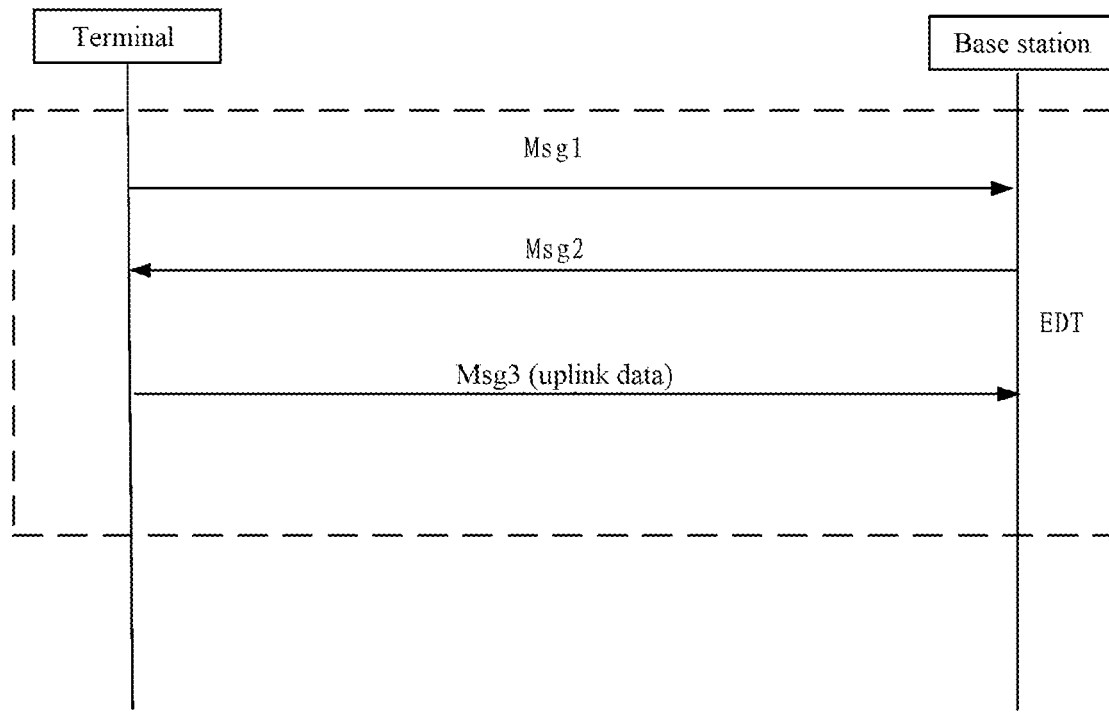
FIG. 5 is a schematic diagram of an early data transmission (EDT) access according to an example.

FIG. 2 shows a complete random access process. An EDT completes data transmission in a random access process, instead of performing data transmission after random access, specifically as shown in FIG. 5. The EDT access mode is to directly carry the uplink data to a base station in the Msg3 of random access, and it is usually applied in transmission scenarios with a small amount of data. As the transmission is completed, the subsequent random access process is directly terminated.

At this time, after the random access of the terminal succeeds, the retransmission data of uplink transmission may be sent. Or, the uplink data is retransmitted in the EDT access process.

In some embodiments, the first information field is also multiplexed into a new data indication field; the new data indication field is used to indicate whether the transmission scheduled by the first DCI is a retransmission or a new transmission. For example, in a granted scheduling-based scenario, the first information field is multiplexed into the new data indication field.

In some other embodiments, the first information field is also multiplexed into the format indication field; the format indication field is used to indicate whether the first DCI is in an uplink transmission scheduling DCI format or a downlink transmission scheduling DCI format.

For example, in a granted scheduling-based scenario, uplink transmission scheduling DCI (UL grant) and downlink transmission scheduling DCI (DL assignment) coexist, and the first information field is also multiplexed into the format indication field.

The uplink transmission scheduling DCI and the downlink transmission scheduling DCI are possibly in different DCI formats. The DCI format is indicated according to the first information field, so that it is convenient for the terminal to reduce the number of alternative formats for blind demodulation of the first DCI after the DCI is received, so as to improve the blind demodulation efficiency of the first DCI.

In some embodiments, the first subfield is also multiplexed into the new data indication field; the new data indication field is used to indicate whether the transmission scheduled by the first DCI is a retransmission or a new transmission; and the second subfield is multiplexed into the format indication field.

The new data indication field is used to indicate whether the transmission scheduled by the first DCI is a retransmission or a new transmission. The new transmission refers to the transmission of information exchanged for the first time between the base station and the terminal; and the retransmission refers to retransmitting data that has been transmitted after the first transmission fails.

In the embodiment of the present disclosure, the mapping relationship between "uplink transmission succeeds", "uplink transmission fails", retransmission and new transmission may be predetermined. For example, there may be two mapping relationships, that is, one first indicator bit of the first subfield not only may indicate the result of the uplink transmission, but also may indicate whether the current transmission is a retransmission or a new transmission through indicating the mapping relationship. For example, "uplink transmission succeeds" is mapped with new transmission, and "uplink transmission fails" is mapped with retransmission; and in this case, the two bit values of one first indicator bit may indicate these two mapping relationships correspondingly.

In some embodiments, under the condition that the first information field indicates scenario 1, the first DCI adopts a first format or a second format. Under the condition that the first information field indicates scenario 2, the first DCI adopts the first format, or the second format, or a third format or a fourth format. Under the condition that the first information field indicates scenario 3, the first DCI adopts the third format or the fourth format. Under the condition that the first information field indicates scenario 4, the first DCI adopts the first format, or the second format, or the third format or the fourth format. Both the first format or the second format may be in the uplink transmission scheduling DCI format. For example, the first format may be in a DCI format 6-0A, and the second format may be in a DCI format 6-0B. The third format or the fourth format may be in the downlink transmission scheduling DCI format. For example, the third format may be in a DCI format 6-1A, and the fourth format may be in a DCI format 6-1B.

For example, when the second subfield is multiplexed into the format indication field, the second indicator bit with a first bit value indicates that the first DCI is in the first format or the second format; and the second indicator bit with a second bit value indicates that the first DCI is in the third format or the fourth format.

Both the first format or the second format may be in an uplink transmission scheduling DCI format. For example, the first format may be in a DCI format 6-0A, and the second format may be in a DCI format 6-0B.

Both the third format or the fourth format may be in a downlink transmission scheduling DCI format. For example, the first format may be in a DCI format 6-1A, and the second format may be in a DCI format 6-1B.

In some embodiments, the second subfield is also multiplexed into a new data indication field, and the second information field has different bit values for indicating whether the transmission scheduled by the first DCI is a retransmission or a new transmission; and the first subfield is multiplexed into a format indication field, and the first subfield has different bit values for indicating whether the first DCI is in an uplink transmission scheduling DCI format or a downlink transmission scheduling DCI format.

In some embodiments, the first information field contains a third indicator bit; the third indicator bit is used to indicate one of the following scenarios:
  a first scenario, in which the uplink transmission succeeds and there is no PDSCH resource scheduling;
  a second scenario, in which the uplink transmission succeeds and there is PDSCH resource scheduling;
  a third scenario, in which the uplink transmission fails and the terminal is instructed to retransmit the uplink transmission; and
  a fourth scenario, in which the uplink transmission fails and the terminal is triggered to perform random access or EDT access.

The first information field is no longer an information field that contains the above-mentioned independent indicator bits including the first indicator bit and the second indicator bit, but contains the third indicator bit for joint indication.

The number of third indicator bits here may be two, and the four bit values of these two third indicator bits may just indicate these four scenarios.

In some embodiments, the first information field containing the third indicator bit is also multiplexed into the format indication field of DCI. For example, the mapping relationships between different scenarios and the DCI format are established in advance. In this way, the third indicator bit realizes the indication of the DCI format and the indication of these 4 scenarios by indicating the mapping relationship between different scenarios and the DCI format.

For example, when the third indicator bit indicates scenario 1, scenario 2 and scenario 4, the third indicator bit is also multiplexed to indicate that the format of the first DCI is the above-mentioned first format or second format. When the third indicator bit indicates scenario 3, the third indicator bit is also multiplexed to indicate that the format of the first DCI is the third format and the fourth format.

The first information field contained in the first DCI as shown in FIG. 6B is formed by the third indicator bit, and the third indicator bit has 2 bits.

In some embodiments, when the uplink transmission succeeds and there is PDSCH resource scheduling, the second information field carries the scheduling information for new transmission of the PDSCH resource;
  when the uplink transmission succeeds and there is no PDSCH resource scheduling, the second information field carries the time advance (TA) or repeated transmissions parameter of the terminal; and
  when the uplink transmission fails and the terminal is instructed to perform a retransmission of the uplink transmission, the second information field carries the retransmission resource information; the retransmission information includes the resource information of the retransmission resource and/or the format information of the retransmission format.

PDSCH resource may be used for the downlink transmission.

The PDSCH resource here is the resource of the downlink transmission scheduled by the first DCI. When the uplink transmission succeeds, the PDSCH resource scheduled by the first DCI is used for the new data transmission. The scheduling information for new transmission may be resource information indicating the PDSCH resource, and the resource information includes: resource location information indicating time domain locations and/or frequency domain locations of the PDSCH resource.

TA is a time advance value for the terminal to send data to the base station. The repeated transmission parameter includes, but is not limited to, a number of repeated transmissions. For example, when an Internet of Things (IoT) device performs a transmission block (TB), one TB is possibly subjected to N transmissions, where N is the number of repeated transmissions. Here, N is a positive integer greater than or equal to 2.

In some embodiments, in case of the retransmission of the uplink transmission under the condition that the uplink transmission fails and the terminal is triggered to re-access, the second information field carries the access mode information and access parameters; the access mode information is used to indicate a random access mode or an early data transmission (EDT) access mode; and the access parameters include: a random access preamble index, an enhanced coverage level index and/or a random access resource indication (PRACH mask).

When the access parameters include the random access preamble index, a random access preamble is searched according to the random access preamble index, and a random access request is sent based on the searched random access preamble. The random access request may be either a random access request in a complete random access request process, or a random access request in an EDT access process.

The enhanced coverage level index indicates an enhanced coverage level used in case of random access or EDT access. The higher the enhanced coverage level, the greater the time diversity grain for the random access request.

The random access resource indication is used to indicate the random access resource of random access or EDT access. The random access resource may be the transmission resource allocated by a base station to a PRACH.

As shown in FIG. 7, the embodiment of the present disclosure provides a DCI transmission method, including the following steps:
  S210: receiving first DCI, the first DCI including: a first information field and a second information field;
  the first information field contains first indication information and second indication information; the first indication information is used to indicate that uplink transmission succeeds or uplink transmission fails;

the second indication information is used when the uplink transmission succeeds to indicate that the second information field carries scheduling information for new transmission or transmission parameter adjustment information; and the second indication information is further used when the uplink transmission fails to indicate that the second information field carries retransmission scheduling information or access indication information.

The DCI transmission method here is used in a terminal. The terminal receives the first DCI delivered by a base station.

The terminal includes, but is not limited to, MTC devices and/or IoT devices.

The first DCI at least includes a first information field and a second information field.

The first information field carries two kinds of indication information, that is, the first indication information and the second indication information. The specific information contents are as shown in the foregoing embodiments, which will not be repeated here. When the terminal parses the first DCI, after the first information field is parsed, the content carried by the second information field may be known by combining the first information field with the second information field, and the content carried by the second information field is correlated with the information content carried by the first information field. When the uplink transmission succeeds and the uplink transmission fails, the second information field is used to carry different information contents. In this way, the second information field is equivalent to being able to indicate different information contents, so that the characteristic that one information field is multiplexed for different information contents is realized, and the information field and the bit overheads required for the first DCI are reduced.

In some embodiments, the first information field includes: a first subfield and a second subfield; the first subfield contains at least one first indicator bit carrying the first indication information; and the second subfield contains at least one second indicator bit carrying the second indication information.

In some embodiments, there may be one first indicator bit and one second indicator bit, and one indicator bit may indicate the information content to be characterized by each of different first information fields.

In some embodiments, the first indicator bit has different bit values for indicating that the uplink transmission succeeds and the uplink transmission fails. The method also includes: determining whether the uplink transmission succeeds or the uplink transmission fails according to the bit value of the first indication information.

In some embodiments, the method further includes:
determining that the uplink transmission succeeds when the bit value of the first indicator bit is different from that of a first indicator bit contained in second DCI; and determining that the uplink transmission fails when the bit value of the first indicator bit is the same as that of the first indicator bit contained in the second DCI.

In some other embodiments, the method further includes: determining that the uplink transmission succeeds when the bit value of the first indicator bit is the same as that of the first indicator bit contained in second DCI; and determining that the uplink transmission fails when the bit value of the first indicator bit is different from that of a first indicator bit contained in the second DCI.

In an embodiment of the present disclosure, the second DCI is the DCI sent before the first DCI for scheduling the uplink transmission.

In some embodiments, the method further includes:
determining the bit value for PDSCH resource scheduling or no PDSCH resource scheduling according to the bit value of the second indicator bit when the uplink transmission succeeds; and
determining retransmission of the uplink transmission or perform random access or EDT access according to the bit value of the second indicator bit when the uplink transmission fails.

In some embodiments, the effect is possibly not good enough in response to directly allocating the retransmission resource to a terminal for data transmission. At this time, when the uplink transmission fails, the base station will instruct the terminal through the second indicator bit to upload data by means of random access after performing random access again, or complete the retransmission of data corresponding to "uplink transmission fails" in the random access process based on the manner of DET access. After the terminal performs the random access again, the terminal may also perform new data transmission.

In some embodiments, the method further includes:
determining whether the transmission scheduled by the first DCI is a retransmission or a new transmission according to the first indicator bit when the first information field is also multiplexed into a new data indication field;

and/or determining whether the first DCI is in an uplink transmission scheduling DCI format or a downlink transmission scheduling DCI format according to the first indicator bit when the first subfield is multiplexed into a format indication field.

The uplink transmission scheduling DCI format is the DCI used for scheduling the uplink transmission, and the downlink transmission scheduling DCI format is the DCI used for scheduling downlink transmission.

Once the DCI format is determined, it is able to accelerate the terminal to perform blind demodulation of DCI and reduce the workload and power consumption for the blind demodulation of DCI.

In some embodiments, the method further includes:
determining whether the transmission scheduled by the first DCI is a retransmission or a new transmission according to the first subfield when the first subfield is also multiplexed into the new data indication field; and
determining whether the first DCI is in an uplink transmission scheduling DCI format or a downlink transmission scheduling DCI format according to the second subfield when the second subfield is multiplexed into the format indication field.

In some other embodiments, the method further includes:
determining whether the transmission scheduled by the first DCI is a retransmission or a new transmission according to the second subfield when the second subfield is also multiplexed into the new data indication field; and
determining whether the first DCI is in the uplink transmission scheduling DCI format or the downlink transmission scheduling DCI format according to the first subfield when the first subfield is multiplexed into the format indication field.

In some embodiments, the method further includes:
determining whether the first DCI is in a first format or a second format according to the second subfield with a first bit value when the second subfield is multiplexed into the format indication field; and determining whether the first DCI is in a third format or a fourth format according to the second subfield with a second bit value.

Both the first format and the second format are the uplink transmission scheduling DCI formats; and the third format and the fourth format are the downlink transmission scheduling DCI formats.

When the second subfield is multiplexed into the format indication field, the uplink transmission scheduling DCI format and the downlink transmission scheduling DCI format correspond to different bit values of the second indication field.

In some embodiments, the first information field contains a third indicator bit; and one of the following scenarios is determined according to the third indicator bit:
 a first scenario, in which the uplink transmission succeeds and there is no PDSCH resource scheduling;
 a second scenario, in which the uplink transmission succeeds and there is PDSCH resource scheduling;
 a third scenario, in which the uplink transmission fails and the terminal is instructed to retransmit the uplink transmission; and
 a fourth scenario, in which the uplink transmission fails and the terminal is triggered to perform random access or EDT access.

Here, in the scenario that the terminal is triggered to perform random access for EDT access, the terminal may retransmit the above-mentioned data that uplink transmission fails after random access, or may complete the uplink transmission in the random access process based on the scenario of EDT access.

In some embodiments, the method further includes:
 determining the scheduling information for new transmission of the PDSCH resource according to the second information field when the uplink transmission succeeds and there is PDSCH resource scheduling;
 determining the time advance (TA) of the terminal or the repeated transmission parameter according to the second information field when the uplink transmission succeeds and there is no PDSCH resource scheduling; and
 determining the retransmission resource information according to the second information field when the uplink transmission fails and the terminal is instructed to retransmit the uplink transmission; the retransmission information includes the resource information of the retransmission resource and/or the format information of the retransmission format.

The resource scheduling information for new transmission is the scheduled resource information of PDSCH resource used for new data transmission.

The time advance (TA) may be a time advance for the terminal to perform uplink transmission.

The repeated transmission parameter may at least include: a number of repeated transmissions.

In some embodiments, the method further includes:
 determining the access mode information and access parameters according to the second information field in case of the retransmission of the uplink transmission under the condition that the uplink transmission fails and the terminal is triggered to re-access, the access mode information is used to indicate a random access mode or an early data transmission (EDT) access mode; and the access parameters include: a random access preamble index, an enhanced coverage level index and/or a random access resource indication.

The embodiment of the present disclosure provides a DCI transmission method, including the following steps:
 One bit (namely the first indicator bit described above) in the DCI is used to indicate whether the current uplink transmission succeeds or fails.

The first indicator bit indicates in the following two manners:
 Manner 1: one bit value of the first indicator bit indicates that the uplink transmission succeeds, and the other bit value indicates that the uplink transmission fails. For example, one first indicator bit with a bit value of "0" indicates that the uplink transmission succeeds, and the first indicator bit with a bit value of "1" indicates that the uplink transmission fails.
 Manner 2: whether the bit value of the first indicator bit turns over between two DCIs is used to represent whether the uplink transmission succeeds or not. For example, a change in in the bit value of the first indicator bit (from "0" to "1") represents that the uplink transmission succeeds, and no change in the bit value represent that the uplink transmission fails.

Then another bit (namely the second indicator bit described above) in the DCI is used to indicate the indication content of other bits in the DCI, for example, indicating the information content of a bit contained in the second information field in the DCI.

The state of the previous bit (namely the first indicator bit) represents that the uplink transmission succeeds, and the current bit (namely the second indicator bit described above) may represent whether there is a subsequent PDSCH transmission. For example, the current bit with a bit value of "0" represents that there is a subsequent PDSCH transmission, and the remaining DCI information field represents the scheduling information for a subsequent PDSCH. The current bit with a bit value of "1" represents that there is no subsequent PDSCH transmission, and the subsequent DCI contains the adjustment information of subsequent transmission. The adjustment information includes at least one of the followings: adjustment information of TA and/or adjustment of a number of repeated transmissions.

When the previous bit (namely the first indicator bit) represents that the uplink transmission succeeds, the current bit (namely the second indicator bit described above) represent triggering a retransmission or triggering the user to perform random access on the PRACH or transmit data by means of EDT. For example, the current bit with a bit value of "0" represents triggering a retransmission, the remaining information field (at least containing the second information field) of the DCI may indicate the information of retransmission resource and retransmission format. The current bit with a bit value of "1" represents triggering random access or EDT access, the remaining information field (at least containing the second information field) of the DCI may represent the access parameters associated with the random access. The access parameters include, but are not limited to, a random access preamble index, a random access resource indication (PRACH MASK) and/or an enhanced coverage level index.

In any of these schemes, the two bits (namely one first indicator bit and one second indicator bit) contained in the DCI may multiplex the current DCI format. The DCI format here includes: a DCI format 6-0A, a DCI format 6-0B, a DCI format 6-1A and a DCI format 6-1B. DCI include a DIC format flag and an NDI field. The DIC format flag is used to indicate DCI 6-0A/6-0B or DCI6-1A/6-1B. The NDI field is used to indicate whether the current indication is a new transmission or retransmission. Here, the DCI format flag and the NDI field may separately correspond to one bit and respectively multiplex one bit in the first indicator bit and/or the second indicator bit, and the bits multiplexed by the DCI format flag and the NDI field are different.

The embodiment of the present disclosure further provides a DCI transmission method, including:

| Bit Values of 2 Bits | Indicated Scenario |
|---|---|
| 00 | Scenario 1 |
| 01 | Scenario 2 |
| 10 | Scenario 3 |
| 11 | Scenario 4 |

Scenario 1: the uplink transmission succeeds and there is no PDSCH resource scheduling; Scenario 2: the uplink transmission succeeds and there is PDSCH resource scheduling; Scenario 3: the uplink transmission fails and the terminal is instructed to retransmit the uplink transmission; and Scenario 4: the uplink transmission fails and the terminal is triggered to perform random access or EDT access.

The bits indicating scenario 1, scenario 2 and scenario 4 in the DCI are also multiplexed to indicate the DCI format 6-0A and the DCI format 6-0B. The bit indicating scenario 3 in the DCI is also multiplexed to indicate the DCI format 6-1A and the DCI format 6-1B.

Figure 8:
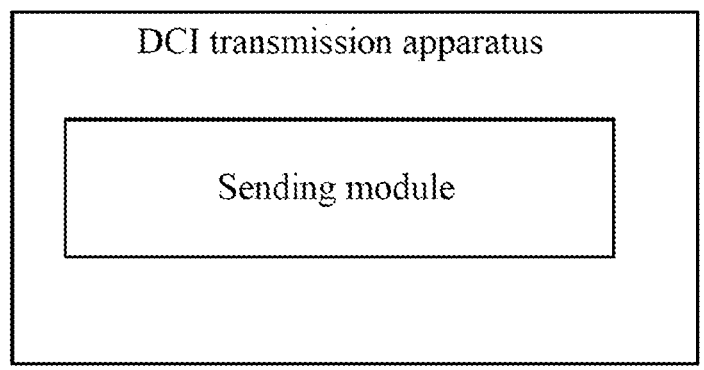
FIG. 8 is a structural diagram of a DCI transmission apparatus according to an example.

As shown in FIG. 8, the embodiment provides a DCI transmission apparatus, including:
a sending module, configured to send first DCI, the first DCI including: a first information field and a second information field;
the first information field contains first indication information and second indication information;
the first indication information is used to indicate that uplink transmission succeeds or uplink transmission fails;
the second indication information is used when the uplink transmission succeeds to indicate that the second information field carries scheduling information for new transmission or transmission parameter adjustment information; and
the second indication information is further used when the uplink transmission fails to indicate that the second information field carries retransmission scheduling information or access indication information.

The DCI transmission apparatus can be applied in a base station.

The sending module may be a program module, a software and hardware integrated module or a pure hardware module.

After the program module is executed by a processor, the sending of the first DCI may be realized.

The software and hardware integrated module includes, but is not limited to, a programmable array; and the programmable array may be either a complex programmable array or a field programmable array.

The pure hardware module includes, but is not limited to, a special integrated circuit.

In some embodiments, the first information field includes: a first subfield and a second subfield; the first subfield contains at least one first indicator bit carrying the first indication information; and the second subfield contains at least one second indicator bit carrying the second indication information.

In some embodiments, the first indicator bit has different bit values to indicate that the uplink transmission succeeds and the uplink transmission fails.

In some embodiments, when the bit value of the first indicator bit is different from that of the first indicator bit contained in second DCI, it indicates that the uplink transmission succeeds; and when the bit value of the first indicator bit is the same as that of the first indicator bit contained in the second DCI, it indicates that the uplink transmission fails;

or, when the bit value of the first indicator bit is the same as that of the first indicator bit contained in second DCI, it indicates that the uplink transmission succeeds; and when the bit value of the first indicator bit is different from that of the first indicator bit contained in the second DCI, it indicates that the uplink transmission fails;

the second DCI is the DCI sent before the first DCI for scheduling the uplink transmission.

In some embodiments, when the uplink transmission succeeds, the second indicator bit has different bit values for indicating PDSCH resource scheduling and no PDSCH resource scheduling;

when the uplink transmission fails, the bit value of the second indicator bit for indicating a terminal to retransmit the uplink transmission is different from that for triggering the terminal to perform random access or EDT access.

In some embodiments, the first information field is also multiplexed into a new data indication field; the first information field is used to indicate whether the transmission scheduled by the first DCI is a retransmission or a new transmission;

and/or, the first information field is also multiplexed into a format indication field; the first information field is also used to indicate whether the first DCI is in an uplink transmission scheduling DCI format or a downlink transmission scheduling DCI format.

In some embodiments, the first subfield is multiplexed into the new data indication field; and
the second subfield is multiplexed into the format indication field.

In some embodiments, when the second subfield is multiplexed into the format indication field, the second indicator bit with a first bit value indicates that the first DCI is in a first format or a second format; and the second indicator bit with a second bit value indicates that the first DCI is in a third format or a fourth format;

the first format and the second format are the uplink transmission scheduling DCI formats; and the third format and the fourth format are the downlink transmission scheduling DCI formats.

In some embodiments, the first information field contains a third indicator bit; the third indicator bit is used to indicate one of the following scenarios:
a first scenario, in which the uplink transmission succeeds and there is no PDSCH resource scheduling;
a second scenario, in which the uplink transmission succeeds and there is PDSCH resource scheduling;
a third scenario, in which the uplink transmission fails and the terminal is instructed to retransmit the uplink transmission; and
a fourth scenario, in which the uplink transmission fails and the terminal is triggered to perform random access or EDT access.

In some embodiments, when the uplink transmission succeeds and there is PDSCH resource scheduling, the second information field carries the scheduling information for new transmission of the PDSCH resource;

when the uplink transmission succeeds and there is no PDSCH resource scheduling, the second information field carries the time advance (TA) of the terminal or the repeated transmission parameter; and when the uplink transmission fails and the terminal is instructed to perform a retransmission of the uplink transmission, the second information field carries the retransmission resource information; the retransmission information includes the resource information of the retransmission resource and/or the format information of the retransmission format.

In some embodiments, in case of the retransmission of the uplink transmission under the condition that the uplink transmission fails and the terminal is triggered to re-access, the second information field carries the access mode information and access parameters; the access mode information is used to indicate a random access mode or an EDT access mode; and the access parameters include: a random access preamble index, an enhanced coverage level index and/or a random access resource indication.

Figure 9:
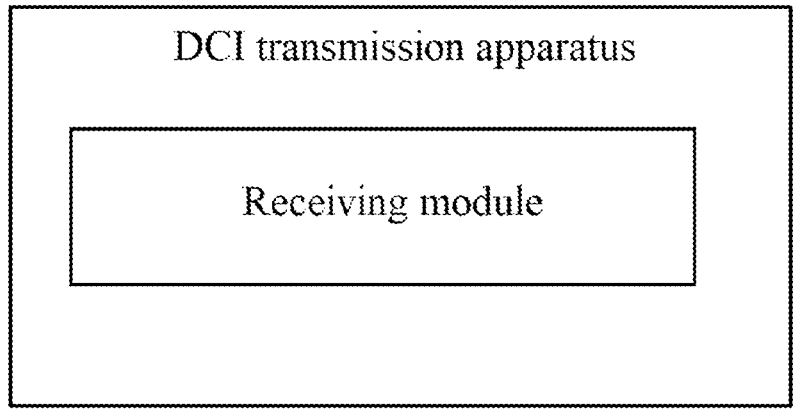
FIG. 9 is a structural diagram of a DCI transmission apparatus according to an example.

As shown in FIG. 9, the embodiment provides a DCI transmission apparatus, including:

a receiving module, configured to receive first DCI, the first DCI including: a first information field and a second information field;

the first information field contains first indication information and second indication information; the first indication information is used to indicate that uplink transmission succeeds or uplink transmission fails;

the second indication information is used when the uplink transmission succeeds to indicate that the second information field carries the scheduling information for new transmission or the transmission parameter adjustment information; and the second indication information is further used when the uplink transmission fails to indicate that the second information field carries retransmission scheduling information or access indication information.

The DCI transmission apparatus can be applied in a base station.

The receiving module may be a program module, a software and hardware integrated module or a pure hardware module.

After the program module is executed by a processor, the receiving of the first DCI may be realized.

The software and hardware integrated module includes, but is not limited to, a programmable array; and the programmable array may be either a complex programmable array or a field programmable array.

In some embodiments, the first information field includes: a first subfield and a second subfield; the first subfield contains at least one first indicator bit carrying the first indication information; and the second subfield contains at least one second indicator bit carrying the second indication information.

In some embodiments, the first indicator bit has different bit values for indicating that the uplink transmission succeeds and uplink transmission fails;

the apparatus further includes:

a first determining module, configured to determine whether the uplink transmission succeeds or the uplink transmission fails according to a bit value of the first indication information.

In some other embodiments, the first determining module is configured to determine the uplink transmission succeeds when the bit value of the first indicator bit is different from that of a first indicator bit contained in second DCI; and determine the uplink transmission fails when the bit value of the first indicator bit is the same as that of the first indicator bit contained in the second DCI; or determine the uplink transmission succeeds when the bit value of the first indicator bit is the same as that of the first indicator bit contained in second DCI; and determine the uplink transmission fails when the bit value of the first indicator bit is different from that of a first indicator bit contained in the second DCI;

the second DCI is the DCI sent before the first DCI for scheduling the uplink transmission.

In some embodiments, the apparatus further includes:

a second determining module, configured to determine the bit value for PDSCH resource scheduling or no PDSCH resource scheduling according to the bit value of the second indicator bit when the uplink transmission succeeds; and determine retransmission of the uplink transmission or random access or EDT access according to the bit value of the second indicator bit when the uplink transmission fails.

In some embodiments, the apparatus further includes:

a third determining module, configured to determine whether the transmission scheduled by the first DCI is a retransmission or a new transmission according to the first indicator bit when the first information field is also multiplexed into a new data indication field; and/or, a fourth determining module, configured to determine whether the first DCI is in an uplink transmission scheduling DCI format or a downlink transmission scheduling DCI format according to the first indicator bit when the first subfield is multiplexed into a format indication field.

In some embodiments, the third determining module is configured to determine whether the transmission scheduled by the first DCI is a retransmission or a new transmission according to the first subfield when the first subfield is also multiplexed into the new data indication field;

the fourth determining module is also configured to determine whether the first DCI is in the uplink transmission scheduling DCI format or the downlink transmission scheduling DCI format according to the second subfield when the second subfield is multiplexed into the format indication field;

the first format and the second format are the uplink transmission scheduling DCI formats; and the third format and the fourth format are the downlink transmission scheduling DCI formats.

In some embodiments, the fourth determining module is configured to determine whether the first DCI is in a first format or a second format according to the second subfield with a first bit value when the second subfield is multiplexed into the format indication field; and determine whether the first DCI is in a third format or a fourth format according to the second subfield with a second bit value.

In some embodiments, the first information field contains a third indicator bit; and the apparatus further includes:

a fifth determining module, configured to determine one of the following scenarios according to the third indicator bit:

a first scenario, in which the uplink transmission succeeds and there is no PDSCH resource scheduling;

a second scenario, in which the uplink transmission succeeds and there is PDSCH resource scheduling;

a third scenario, in which the uplink transmission fails and a terminal is indicated to perform the retransmission of the uplink transmission; and a fourth scenario, in which the uplink transmission fails and the terminal is triggered to perform random access or EDT access.

In some embodiments, the apparatus further includes: a sixth determining module;

the sixth determining module is configured to determine the scheduling information for new transmission of the PDSCH resource according to the second information field when the uplink transmission succeeds and there is PDSCH resource scheduling;

determine the time advance (TA) of the terminal or the repeated transmission parameter according to the second information field when the uplink transmission succeeds and there is no PDSCH resource scheduling; and determine the retransmission resource information according to the second information field when the uplink transmission fails and the terminal is instructed to perform a retransmission of the uplink transmission; the retransmission information includes the resource information of the retransmission resource and/or the format information of the retransmission format.

In some embodiments, the apparatus further includes: a sixth determining module;

the sixth determining module is configured to determine the access mode information and access parameters according to the second information field in case of the retransmission of the uplink transmission under the condition that the uplink transmission fails and the terminal is triggered to re-access; the access mode information is used to indicate a random access mode or an EDT access mode; and the access parameters include: a random access preamble index, an enhanced coverage level index and/or a random access resource indication.

Figure 10:
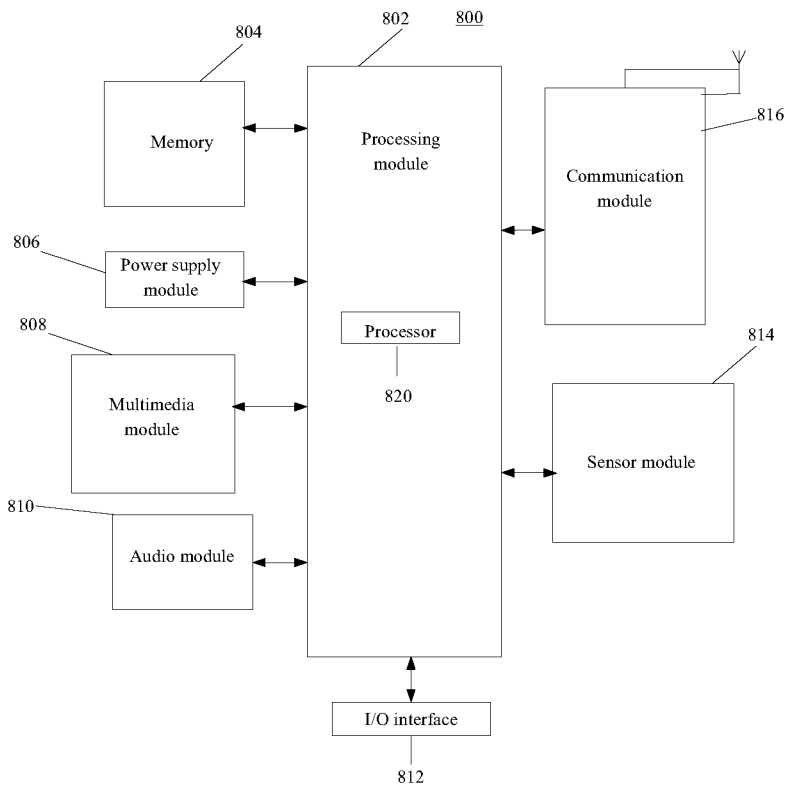
FIG. 10 is a structural diagram of a terminal according to an example.

FIG. 10 is a terminal according to an example, and the terminal specifically may be a mobile phone, a computer, a digital broadcasting terminal, a message transmitter-receiver, a game console, a tablet device, a medical device, a fitness device, and a personal digital assistant.

As shown in FIG. 10, the terminal 800 may include one or some of the following components: a processing module 802, a memory 804, a power supply module 806, a multimedia module 808, an audio module 810, an input/output (I/O) interface 812, a sensor module 814 and a communication module 816.

The processing module 802 generally controls the overall operation of the terminal 800, such as operations associated with display, phone calls, data communications, camera operations and recording operations. The processing module 802 may include one or more processors 820 which execute instructions, in order to complete all or part of the above-mentioned method. In addition, the processing module 802 may include one or more modules to facilitate interaction of the processing module 802 with other modules. For example, the processing module 802 may include a multimedia module to facilitate interaction of the multimedia module 808 with the processing module 802.

The memory 804 is configured to store various data to support operations on the device 800. Examples of such data include instructions for any disclosure or method operating on the terminal 800, contact data, phonebook data, messages, images, videos, etc. The memory 804 may be implemented by any type of volatile or non-volatile storage device or a combination thereof, such as static random access memory (SRAM), electrically erasable programmable read-only memory (EEPROM), erasable programmable memory programmable read-only memory (EPROM), programmable read-only memory (PROM), read-only memory (ROM), magnetic memory, flash memory, magnetic disk, or optical disk.

The power supply module 806 supplies power to various modules of the terminal 800. The power supply module 806 may include a power management system, one or more power supplies, and other modules associated with generating, managing, and distributing power to the terminal 800.

The multimedia module 808 includes a screen providing an output interface between the terminal 800 and a user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense gestures of touching and sliding on the touch panel. The touch sensors not only may sense boundaries of a touch or slide action, but also may detect the duration and pressure associated with the touch or slide action. In some embodiments, the multimedia module 808 includes a front camera and/or a rear camera. When the device 800 is in an operation mode, such as shooting mode or video mode, the front camera and/or the rear camera may receive external multimedia data. Each of the front camera and the rear camera may be a fixed optical lens system or have focal length and optical zooming capability.

The audio module 810 is configured to output and/or input audio signals. For example, the audio module 810 includes a microphone (MIC); when the terminal 800 is in an operation mode, such as call mode, record mode and voice recognition mode, the microphone is configured to receive an external audio signal. The received audio signal may be further stored in the memory 804 or transmitted via the communication module 816. In some embodiments, the audio module 810 also includes a speaker configured to output audio signals.

The I/O interface 812 provides an interface between the processing module 802 and a peripheral interface module, and the peripheral interface module may be a keyboard, a click wheel or buttons. These buttons may include, but are not limited to, a home button, volume buttons, a start button, and a lock button.

The sensor module 814 includes one or more sensors configured to provide various aspects of status assessment for the terminal 800. For example, the sensor module 814 may monitor an on/off state of the terminal 800, and the relative positioning of modules, for example, the modules are a display and a keypad of the terminal 800; the sensor module 814 may also detect the positional change of the terminal 800 or a component of the terminal 800, the presence or absence of user contact with the terminal 800, the direction or acceleration/deceleration of the terminal 800, and a change in the temperature of the terminal 800. The sensor module 814 may include a proximity sensor which is configured to detect the presence of nearby objects in the absence of any physical contact. The sensor module 814 may also include a light sensor, such as CMOS or CCD image sensor, which is configured to be used in an imaging disclosure. In some embodiments, the sensor module 814 may also include an acceleration sensor, a gyroscope sensor, a magnetic sensor, a pressure sensor, or a temperature sensor.

The communication module 816 is configured to facilitate wired or wireless communication between the terminal 800 and other devices. The terminal 800 may be accessed to a wireless network based on a communication standard, such as Wi-Fi, 2G or 3G, or their combination. In an example, the communication module 816 receives broadcast signals or broadcast related information from an external broadcast management system via a broadcast channel. In an example, the communication module 816 also includes a near field communication (NFC) module so as to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an example, the terminal 800 may be implemented by one or a plurality disclosure specific integrated circuits (ASICs), a digital signal processor (DSP), a digital signal processing device (DSPD), a programmable logic device (PLD), a field programmable gate array (FPGA), a controller, a micro-controller, a microprocessor, or other electronic components, in order to implement the above method.

In an example, a non-transitory computer readable storage medium containing instructions is also provided, such as a memory 804 containing instructions, and the above-mentioned instructions may be executed by the processor 820 of the terminal 800 in order to complete the above-mentioned method. For example, the non-transitory computer readable storage medium may be an ROM, a random access memory (RAM), a CD-ROM, a magnetic tape, a floppy disk, and an optical data storage device.

Figure 11:
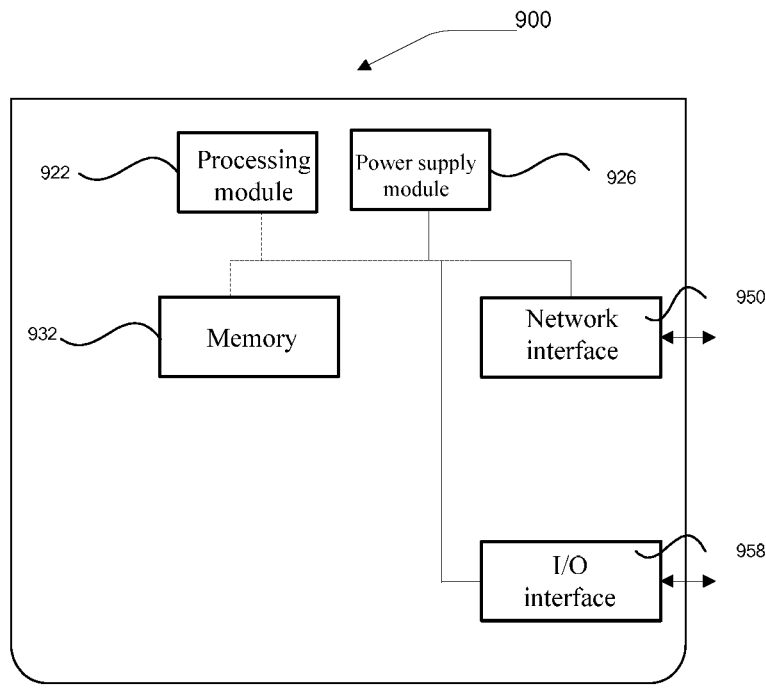
FIG. 11 is a structural diagram of a base station according to an example.

FIG. 11 is a schematic diagram of a base station. As shown in FIG. 11, the base station 900 includes a processing module 922 which further includes one or more processors, and a memory resource represented by a memory 932 and configured to store instructions executable by the processing module 922, such as a disclosure program. The disclosure program stored in the memory 932 may include one or more modules, and each of the modules corresponds to a set of instructions. In addition, the processing module 922 is configured to execute instructions so as to execute any of the DCI transmission methods as shown in FIGS. 3-5.

The base station 900 may also include a power supply module 926 configured to perform power management of the base station 900, a wired or wireless network interface 950 configured to connect the base station 900 to a network, and an input/output (I/O) interface 958. The base station 900 may operate an operating system based on being stored in the memory 932, such as Windows Server™, Mac OS X™, Unix™, Linux™, Free BSD™ or the like.

An embodiment of the present disclosure provides a communication device, which may be a terminal or a base station. The communication device includes:
 a transceiver;
 a memory; and
 a processor, connected with an antenna and the memory respectively, and configured to control the transceiver to transmit and receive wireless signals through executing computer-executable instructions stored in the memory, so as to realize the DCI transmission method provided by any of the above-mentioned embodiments, for example, execute any of the DCI transmission methods as shown in FIGS. 4-7.

An embodiment of the present disclosure further provides a non-transitory computer storage medium; computer-executable instructions are stored in the non-transitory computer storage medium; and the DCI transmission method provided by any of these embodiments, for example, at least one of the methods as shown in FIGS. 4-7, is realized after the computer-executable instructions are executed by the processor.

Those skilled in the art will easily obtain other embodiments of the present disclosure after considering the specification and practicing the disclosed invention. The present disclosure is intended to cover any variation, disclosure or adaptive change of the present disclosure, and these variations, disclosures or adaptive changes follow the general principle of the present disclosure and include common general knowledge or conventional technical means in the technical field not disclosed in the present disclosure. The specification and the embodiments are merely deemed as examples, and the real scope and spirit of the present disclosure are indicated by the claims below.

It will be understood that the present disclosure is not limited to the accurate structures as described previously and shown in the accompanying drawings, and various modifications and changes can be made without departing from the scope. The scope of the present disclosure is merely defined by the claims attached.

What is claimed is:

1. A DCI (Downlink Control Information) transmission method, comprising:
 sending first DCI, the first DCI comprising: a first information field and a second information field;
 the first information field contains a first subfield for determining first indication information, and a second subfield for determining second indication information;
 wherein the first indication information is used to indicate that an uplink transmission succeeds or the uplink transmission fails;
 a first state of the second indication information indicates the second information field is used to determine a time advance (TA); and
 a second state of the second indication information indicates the second information field is used to determine retransmission scheduling information,
 wherein the first subfield contains at least one first indicator bit carrying the first indication information; and the second subfield contains at least one second indicator bit carrying the second indication information;
 wherein in a case that a bit value of the first indicator bit is different from that of the first indicator bit contained in second DCI, it indicates that the uplink transmission succeeds; and in a case that the bit value of the first indicator bit is the same as that of the first indicator bit contained in the second DCI, it indicates that the uplink transmission fails, or
 wherein in a case that the bit value of the first indicator bit is the same as that of the first indicator bit contained in the second DCI, it indicates that the uplink transmission succeeds; and in a case that the bit value of the first indicator bit is different from that of the first indicator bit contained in the second DCI, it indicates that the uplink transmission fails,
 wherein the second DCI is DCI sent before the first DCI for scheduling the uplink transmission, and
 wherein the first indicator bit has different bit values for indicating that the uplink transmission succeeds or the uplink transmission fails.

2. The method of claim 1, wherein
 in a case that the uplink transmission succeeds, the second indicator bit has different bit values for indicating that there is physical downlink shared channel (PDSCH) resource scheduling and there is no PDSCH resource scheduling; and
 in a case that the uplink transmission fails, a bit value of the second indicator bit for indicating a terminal to retransmit the uplink transmission is different from that for triggering the terminal to perform a random access or an early data transmission (EDT) access.

3. The method of claim 1, wherein the first information field is further multiplexed into at least one of the following:
a new data indication field, wherein the first information field is used to indicate whether a transmission scheduled by the first DCI is a retransmission or a new transmission; or
a format indication field, wherein the first information field is further used to indicate whether the first DCI is in an uplink transmission scheduling DCI format or a downlink transmission scheduling DCI format,
wherein the first subfield is multiplexed into the new data indication field, and
wherein the second subfield is multiplexed into the format indication field.

4. The method of claim 3, wherein
in a case that the second subfield is multiplexed into the format indication field, the second indicator bit with a first bit value indicates that the first DCI is in a first format or a second format; and the second indicator bit with a second bit value indicates that the first DCI is in a third format or a fourth format, and
wherein the first format and the second format are the uplink transmission scheduling DCI formats, and the third format and the fourth format are the downlink transmission scheduling DCI formats.

5. The method of claim 1, wherein
in a case that the uplink transmission succeeds and there is physical downlink shared channel (PDSCH) resource scheduling, the second information field carries scheduling information for a new transmission of the PDSCH resource;
in a case that the uplink transmission succeeds and there is no PDSCH resource scheduling, the second information field carries the TA of a terminal or a repeated transmission parameter; and
in a case that the uplink transmission fails and the terminal is instructed to retransmit the uplink transmission, the second information field carries retransmission information; wherein the retransmission information comprises at least one of the following: resource information of a retransmission resource, or format information of a retransmission format; and
wherein in a case of a retransmission of the uplink transmission under a condition that the uplink transmission fails and the terminal is triggered to re-access, the second information field carries access mode information and access parameters, wherein the access mode information is used to indicate a random access mode or an early data transmission (EDT) access mode; and the access parameters comprise at least one of the following: a random access preamble index, an enhanced coverage level index, or a random access resource indication.

6. A communication device, comprising:
a transceiver;
a memory; and
a processor, connected with the transceiver and the memory respectively, and configured to control the transceiver to transmit and receive wireless signals through executing computer-executable instructions stored in the memory, to perform the method according to claim 1.

7. A DCI (Downlink Control Information) transmission method, comprising:
receiving first DCI, the first DCI comprising: a first information field and a second information field;
the first information field contains a first subfield for determining first indication information, and a second subfield for determining second indication information; wherein the first indication information is used to indicate that an uplink transmission succeeds or the uplink transmission fails;
a first state of the second indication information indicates the second information field is used to determine a time advance (TA); and
a second state of the second indication information indicates the second information field is used to determine retransmission scheduling information,
wherein the first subfield contains at least one first indicator bit carrying the first indication information; and the second subfield contains at least one second indicator bit carrying the second indication information;
wherein the method further comprises:
determining that the uplink transmission succeeds in a case that a bit value of the first indicator bit is different from that of the first indicator bit contained in second DCI; and determining that the uplink transmission fails in a case that the bit value of the first indicator bit is the same as that of the first indicator bit contained in the second DCI, or
determining that the uplink transmission succeeds in a case that the bit value of the first indicator bit is the same as that of the first indicator bit contained in the second DCI; and determining that the uplink transmission fails in a case that the bit value of the first indicator bit is different from that of the first indicator bit contained in the second DCI,
wherein the second DCI is the DCI sent before the first DCI for scheduling the uplink transmission, and
wherein the first indicator bit has different bit values for indicating that the uplink transmission succeeds and the uplink transmission fails.

8. The method of claim 7, further comprises:
determining whether the uplink transmission succeeds or the uplink transmission fails according to a bit value of the first indication information.

9. The method of claim 7, wherein the method further comprises:
determining a bit value for physical downlink shared channel (PDSCH) resource scheduling or no PDSCH resource scheduling according to a bit value of the second indicator bit in a case that the uplink transmission succeeds; and
determining retransmission of the uplink transmission or a random access or an early data transmission (EDT) access according to the bit value of the second indicator bit in a case that the uplink transmission fails.

10. The method of claim 7, wherein the method further comprises at least one of the following:
determining whether a transmission scheduled by the first DCI is a retransmission or a new transmission according to the first indicator bit in a case that the first information field is further multiplexed into a new data indication field; or
determining whether the first DCI is in an uplink transmission scheduling DCI format or a downlink transmission scheduling DCI format according to the first indicator bit in a case that the first subfield is multiplexed into a format indication field.

11. The method of claim 10, wherein the method further comprises:

determining whether the transmission scheduled by the first DCI is the retransmission or the new transmission according to the first subfield in a case that the first subfield is further multiplexed into the new data indication field; and determining whether the first DCI is in the uplink transmission scheduling DCI format or the downlink transmission scheduling DCI format according to the second subfield in a case that the second subfield is multiplexed into the format indication field.

12. The method of claim 11, wherein the method further comprises:
determining whether the first DCI is in a first format or a second format according to the second subfield with a first bit value in a case that the second subfield is multiplexed into the format indication field; and
determining whether the first DCI is in a third format or a fourth format according to the second subfield with a second bit value,
wherein the first format and the second format are the uplink transmission scheduling DCI formats, and
wherein the third format and the fourth format are the downlink transmission scheduling DCI formats.

13. The method of claim 7, wherein
the first information field contains a third indicator bit, and
one of the following scenarios is determined according to the third indicator bit:
a first scenario, in which the uplink transmission succeeds and there is no physical downlink shared channel (PDSCH) resource scheduling,
a second scenario, in which the uplink transmission succeeds and there is physical downlink shared channel (PDSCH) resource scheduling,
a third scenario, in which the uplink transmission fails and a terminal is instructed to retransmit the uplink transmission, or
a fourth scenario, in which the uplink transmission fails and the terminal is triggered to perform a random access or an early detected transmission (EDT) access.

14. The method of claim 7, wherein the method further comprises:
determining scheduling information for a new transmission of a physical downlink shared channel (PDSCHI) resource according to the second information field in a case that the uplink transmission succeeds and there is PDSCH resource scheduling;
determining the TA of a terminal or a repeated transmission parameter according to the second information field in a case that the uplink transmission succeeds and there is no PDSCH resource scheduling; and
determining retransmission information according to the second information field in a case that the uplink transmission fails and the terminal is instructed to retransmit the uplink transmission; wherein the retransmission information comprises at least one of the following: resource information of a retransmission resource, or format information of a retransmission format.

15. The method of claim 14, wherein the method further comprises:
determining access mode information and access parameters according to the second information field in a case of a retransmission of the uplink transmission under a condition that the uplink transmission fails and the terminal is triggered to re-access,
wherein the access mode information is used to indicate a random access mode or an EDT access mode, and
wherein the access parameters comprise at least one of the following: a random access preamble index, an enhanced coverage level index, or a random access resource indication.

16. A communication device, comprising:
a transceiver;
a memory; and
a processor, connected with the transceiver and the memory respectively, and configured to control the transceiver to transmit and receive wireless signals through executing computer-executable instructions stored in the memory, to perform the method according to claim 7.

* * * * *

UNITED STATES PATENT AND TRADEMARK OFFICE
CERTIFICATE OF CORRECTION

PATENT NO. : 12,369,162 B2  
APPLICATION NO. : 17/776455  
DATED : July 22, 2025  
INVENTOR(S) : Qin Mu Page 1 of 1

It is certified that error appears in the above-identified patent and that said Letters Patent is hereby corrected as shown below:

On the Title Page
On Page 2, in item (56), under "OTHER PUBLICATIONS", in Column 2, Line 2, delete "#93,R1-1807239,Busan," and insert -- #93, R1-1807239, Busan, --, therefor.
On Page 2, in item (56), under "OTHER PUBLICATIONS", in Column 2, Line 6, delete "CATT. ""Discussion on NR DCI formats""" and insert -- CATT, "Discussion on NR DCI formats" --, therefor.
On Page 2, in item (56), under "OTHER PUBLICATIONS", in Column 2, Line 8, delete "document ;Type-A." and insert -- document; Type-A. --, therefor.

In the Specification
In Column 2, Line 14, delete "uplink" and insert -- that uplink --, therefor.
In Column 2, Line 65, delete "example:" and insert -- example; --, therefor.
In Column 5, Line 3, delete "evolution" and insert -- evolved --, therefor.
In Column 6, Line 66, delete "to the" and insert -- the --, therefor.
In Column 16, Line 20, delete "in in" and insert -- in --, therefor.
In Column 20, Line 60, delete "bit:" and insert -- bit; --, therefor.

In the Claims
In Column 24, Line 39, in Claim 1, delete "information;" and insert -- information, --, therefor.
In Column 28, Line 4, in Claim 14, delete "(PDSCHI)" and insert -- (PDSCH) --, therefor.

Signed and Sealed this  
Thirtieth Day of September, 2025

John A. Squires  
*Director of the United States Patent and Trademark Office*